United States Patent
Niebling et al.

(10) Patent No.: US 7,547,147 B2
(45) Date of Patent: Jun. 16, 2009

(54) WHEEL BEARING UNIT EMBODIED AS AN ANGULAR CONTACT BALL BEARING

(75) Inventors: Peter Niebling, Bad Kissingen (DE); Heinrich Hofmann, Schweinfurt (DE); Darius Dlugai, Schweinfurt (DE); Jens Heim, Schweinfurt (DE); David Ilgert, Ontario (CA)

(73) Assignee: Fag Kugelfischer AG (DE)

( * ) Notice: Subject to any disclaimer, the term of this patent is extended or adjusted under 35 U.S.C. 154(b) by 357 days.

(21) Appl. No.: 10/564,256

(22) PCT Filed: Jul. 9, 2004

(86) PCT No.: PCT/DE2004/001495

§ 371 (c)(1),
(2), (4) Date: Apr. 18, 2006

(87) PCT Pub. No.: WO2005/008086

PCT Pub. Date: Jan. 27, 2005

(65) Prior Publication Data

US 2007/0104404 A1    May 10, 2007

(30) Foreign Application Priority Data

Jul. 15, 2003    (DE) ................... 103 31 936

(51) Int. Cl.
F16C 19/18    (2006.01)
(52) U.S. Cl. .................. 384/544; 384/504; 384/512

(58) Field of Classification Search ............... 384/504, 384/512–516, 544, 545, 589
See application file for complete search history.

(56) References Cited

U.S. PATENT DOCUMENTS

| 466,446 | A | * | 1/1892 | Simonds | ............ 384/545 |
| 804,954 | A | | 11/1905 | Johanson | |
| 845,778 | A | | 3/1907 | Hachfield | |
| 918,422 | A | | 4/1909 | Coppins | |
| 1,325,113 | A | * | 12/1919 | Rohn | ............ 384/512 |
| 5,118,205 | A | * | 6/1992 | Hoffmann | ............ 384/458 |
| 5,490,732 | A | | 2/1996 | Hassiotis et al. | |
| 6,824,489 | B2 | * | 11/2004 | Jacob et al. | ............ 384/504 |
| 6,957,919 | B2 | * | 10/2005 | Kern et al. | ............ 384/526 |

FOREIGN PATENT DOCUMENTS

| EP | 1403539 A1 | * | 3/2004 |
| GB | 206606 | | 11/1923 |
| WO | WO 85/03749 | * | 8/1985 |
| WO | WO 93/17251 | * | 9/1993 |

OTHER PUBLICATIONS

International Search Report PCT/DE2004/001495 dated Oct. 27, 2004.
International Search Report for PCT/DE2004/001495, dated Oct. 27, 2004.

* cited by examiner

*Primary Examiner*—Thomas R Hannon
(74) *Attorney, Agent, or Firm*—Ostrolenk, Faber, Gerb & Soffen, LLP

(57) ABSTRACT

A wheel bearing unit (1) is embodied in a four-rowed angular contact ball bearing form.

17 Claims, 8 Drawing Sheets

WHEEL BEARING UNIT EMBODIED AS AN ANGULAR CONTACT BALL BEARING

CROSS REFERENCE TO RELATED APPLICATION

The present application is a 35 U.S.C. §§ 371 national phase conversion of PCT/EP2004/001495, filed 9 Jul. 2004, which claims priority of German Application No. 103 31 936.0, filed 15 Jul. 2003. The PCT International Application was published in the German language.

FIELD OF THE INVENTION

The invention relates to a wheel bearing unit embodied as an angular contact ball bearing with at least two first rows of balls, which rows run around a central axis of the wheel bearing unit, and with two second rows of balls, which rows are arranged parallel to the first rows, a first pairing from a first row and from a second row in each case being preloaded against a second pairing from a first row and from a second row.

BACKGROUND OF THE INVENTION

Such a wheel bearing unit is illustrated in GB 206,606. This wheel bearing unit is no longer suited to the demands made on modern vehicles, in particular as far as the mounting of the wheel bearing arrangement on the vehicle is concerned. Up until the time the invention was made, the expert selected tapered-roller bearings for wheel bearing arrangements on vehicles for medium and great loads. The advantage of using tapered-roller bearings lies in their considerably higher load carrying capacity, compared with the two-row angular contact ball bearings usually used, if bearings of both kinds which require the same construction space are compared with one another. With the use of tapered roller bearings, the known disadvantages of these are therefore also accepted. These disadvantages are essentially:

- great weight and thus undesirably high, unsprung masses on the vehicle;
- high frictional resistance by virtue of undesirable end contact between the rims of the inner ring and the tapered rollers;
- the outer ring and the inner ring become misaligned during operation of the vehicle on account of the operating play in relation to one another;
- relatively high manufacturing costs.

FIG. 1 illustrates a prior art wheel bearing unit 38 with a tapered roller bearing from the range of supply of the applicant. The wheel bearing unit 38 is formed essentially from an outer ring 39, a pair of neighboring inner rings 40, two opposing rows of tapered rollers 41 and seals 23. The seal 23 is a cassette seal and has, on a reinforcement 21 fastened to the outer ring, three sealing lips 14, 15, 24 (FIG. 1b). One 24 of the sealing lips is prestressed against the inner ring 40 peripherally and radially. The next sealing lip 14 bears radially inwardly against a cylindrical portion of a slinger plate. The actual slinger plate is angled radially outward from the portion.

A reciprocally magnetized encoder or another signal transmitter 42, is optionally located on the slinger plate. A sensor 43 lies opposite the transmitter, as illustrated in FIG. 1b. A third 15 of the sealing lips bears axially against a radial portion of the slinger plate. A brake disk 44 is fixed on one of the bearing rings 39, 40. The brake disk is illustrated without assignment in FIG. 1a.

The wheel bearing unit 38 is prestressed without play or virtually without play via the inner rings 40 by means of the flanged rim 7a. Owing to the operating play during driving operation, the outer ring 39 can tilt in relation to the inner ring 40 by an angle α in relation to a plane E lying at right angles to the central axis of the wheel bearing unit and/or be displaced axially in the direction of the double arrow in relation to the tapered rollers 41 or to the inner ring 40. The outline of the outer ring 39 illustrated by the dashed line shows the outer ring 39 when it has drifted on account of the play. Stress peaks in the raceways and on the tapered rollers 41 and consequently the risk of overloading of the bearing are the result.

The shifts of the outer ring 39 have a disadvantageous effect on the connection construction. The seals 23 of the bearing are subjected to greater demands and in the case of large shifts no longer have the necessary sealing characteristics. The shifts of the outer ring 39 may lead to one or more of the sealing lips 14, 15 or 24 of the seal 23 lifting partly off the slinger plate or the inner ring 40. The possible effects are indicated by the dashed lines in FIG. 1b. The sealing action is then discontinued at the gaps S1 and S2. Furthermore, for example, the brake disk 44 fastened to the outer ring 39 or inner ring 40 drifts with the ring 39 or 40 concerned in relation to the rest of the bearing and surrounding construction or tilts with it, as illustrated in FIG. 1a. The encoder or another signal transmitter 42 moves closer to the sensor 43, and the spacings between sensor 43 and the encoder or another signal transmitter 42 are uneven. Inaccurate signals of the sensor technology of electronic measuring systems are the result. The brake disk 44 fixed on one of the bearing rings 39, 40 shifts with the bearing ring 39, 40 concerned. The position in relation to the brake shoes 45 interacting with the brake disk 44 becomes inaccurate. Reduced braking capacity and premature wear on the brake disk 44 and on the brake shoes are the result.

SUMMARY OF THE INVENTION

The object of the invention is therefore to produce a wheel bearing unit with a four-row angular contact ball bearing, which meets the demands made on modern wheel bearing arrangements and is interchangeable with unchanged construction space with a wheel bearing unit with the usual tapered roller bearings.

This object is achieved with the invention. The wheel bearing unit has an outer ring extending around both pairings of rows of balls together on the outside. The outer ring is provided with a radially inwardly projecting middle rim and the raceways for the pairings. The raceways for each row of balls are formed in the outer ring. Furthermore, the wheel bearing unit optionally has one inner ring or two inner rings.

It is also decisive according to a one development of the invention that the wheel bearing unit is a subassembly which holds together in itself at least the balls, the outer ring and the inner ring. This subassembly can be fully preassembled by the rolling bearing manufacturer and supplied to the vehicle manufacturer without component parts being lost. The vehicle manufacturer can fasten the wheel bearing unit directly to the axle construction of the vehicle and attach the corresponding vehicle wheel.

The individual rows of balls of the wheel bearing arrangements have inner and outer raceways which are staggered in relation to one another in the direction of the bearing axis (central axis). Each pairing from a first and from a second row takes up only axial forces in one direction. In the case of radial loading of the wheel bearing, a force acting in the axial direction arises in the wheel bearing, which has to be balanced by a counterforce. Each pairing is therefore preloaded against another pairing and axially secured. The inner ring or rings is or are for this purpose provided with a rim on the outside at the end, on which the raceways of the second row are advantageously at least partly designed and which makes it possible for the pairings to be preloaded, that is braced, against one another.

The pairings of the wheel bearing unit according to the invention are braced axially in relation to one another via the inner rings located concentrically on a cylindrical portion of a flange body or via an inner raceway on the flange body and via an inner ring. The flange body is as a rule designed rotationally symmetrically about the central axis of the wheel bearing arrangement.

The inner ring has two raceways for two of the parallel ball rows, these being in each case a first and also a second row of balls in a pairing. The second rows of balls are located axially on the outside in the bearing and receive the mutually adjacent first rows of balls between them. In the event of use being made of only one inner ring on the flange body, the inner ring bears axially against a support rim on the flange body, two raceways formed directly in the flange body for the other of the pairings lying adjacent to the inner ring axially. During assembly of the wheel bearing unit, the pairings are braced and held axially by means of a radially outwardly facing flanged rim lying axially opposite the support rim. For this purpose, an axial hollow-cylindrical end portion on the flange body is shaped plastically radially outward in such a way that it bears against that end side of one of the inner rings located axially on the outside.

According to another development of the invention, the wheel bearing unit is provided with at least one fastening element for fastening the wheel bearing arrangement on the vehicle and/or at least one further fastening element for fastening a wheel to the wheel bearing arrangement. These fastening elements are, for example, flanges on the inner and/or outer ring or a number of radially protruding projections distributed on the periphery of the rings. With a further development of the invention, the flange body has one of the fastening elements. In this connection, the fastening element is, for example, a flange or the like, extending radially from the flange body, for fastening a wheel or a brake disk or for fastening the wheel bearing unit on the vehicle. Provision is also made for the outer ring to have at least one of the fastening elements. The fastening element is designed in one piece with the outer ring and is at least one radial projection. The radial projection is preferably designed to form a flange running all around. It is also conceivable to design two of the flanges on the outer ring. The flange(s) is (are) provided optionally for fastening a brake disk or a vehicle wheel and in the case of one flange optionally also for fastening the wheel bearing unit to the vehicle via the outer ring.

Further developments of the invention are described in greater detail in the section "Detailed description of the drawings".

The advantages of a four-row angular contact ball bearing in comparison with conventional two-row angular contact ball bearings are:
 reduction of the weight by virtue of compact construction;
 high load rating;
 uniform force introduction in the outer ring/inner ring and wheel flange by virtue of four rows of balls with many small rolling elements per row. By virtue of the uniform force introduction, the component loading is reduced and ring cross sections can be reduced. The loading of the flanged rim is reduced by the more uniform pressure distribution over the joints between the seat of the inner ring and of the flange body;
 when use is made of surface-hardened bearing rings or raceways, the use of balls with smaller diameters means smaller hardening depths and thus also shorter processing times in the hardening process. Furthermore, the cross sections of the rings can be reduced. Significant potential for cost savings on material and in production is created;
 bearing tilting is reduced by up to 50%. The functional reliability and comfort of the brakes are consequently improved;
 owing to lower axial drift, the wheel is guided better. The lower bearing tilting leads moreover to an improvement of the sealing function and reduction of the seal friction as the sealing lip overlap can be reduced;
 by using balls which have different diameters from row to row or are preloaded with different pressure angles or have different osculations, it is possible to adapt the take-up of loading optimally.

Low bearing tilting and drift of the outer ring are essential prerequisites for accurate functioning of electronic measuring systems on the vehicle wheel, which are, for example, components of ABS systems.

The advantages in comparison with tapered roller bearing units are:
 the bearing tilting is, with all the advantages described above, reduced by up to 40%;
 there is no power loss owing to high rim friction of the tapered rollers on the rims of the bearing rings. This has an advantageous effect on the fuel consumption of the vehicle and also reduces heat generation in the wheel bearing unit;
 lower axial displacement under loading with all the advantages described above;
 the four-row angular contact ball bearing design according to the invention is, with the same construction space, interchangeable with a tapered roller bearing unit.

BRIEF DESCRIPTION OF THE DRAWINGS

Further details and developments of the invention are explained in greater detail below with reference to illustrative embodiments described in FIGS. 2 to 8, in which, in particular.

DETAILED DESCRIPTION OF THE DRAWINGS

Figure 1:
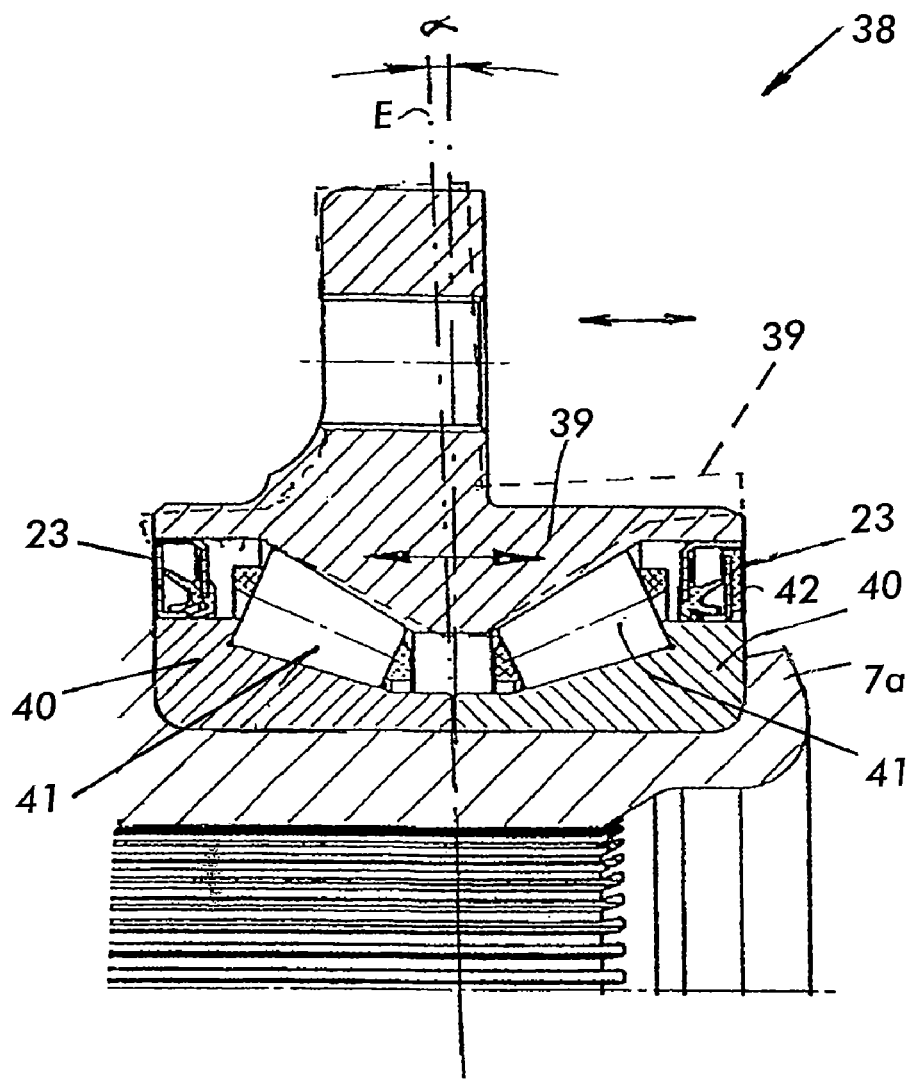
FIG. 1 shows the sectioned part view of a known tapered roller bearing with the details enlarged in FIGS. 1a and 1b.
Figure 1A:
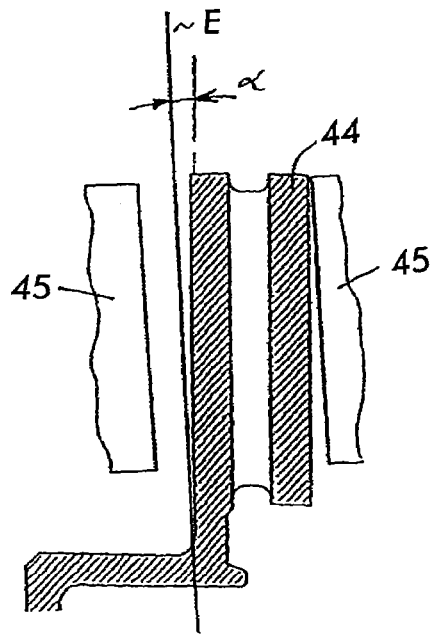
Figure 2:
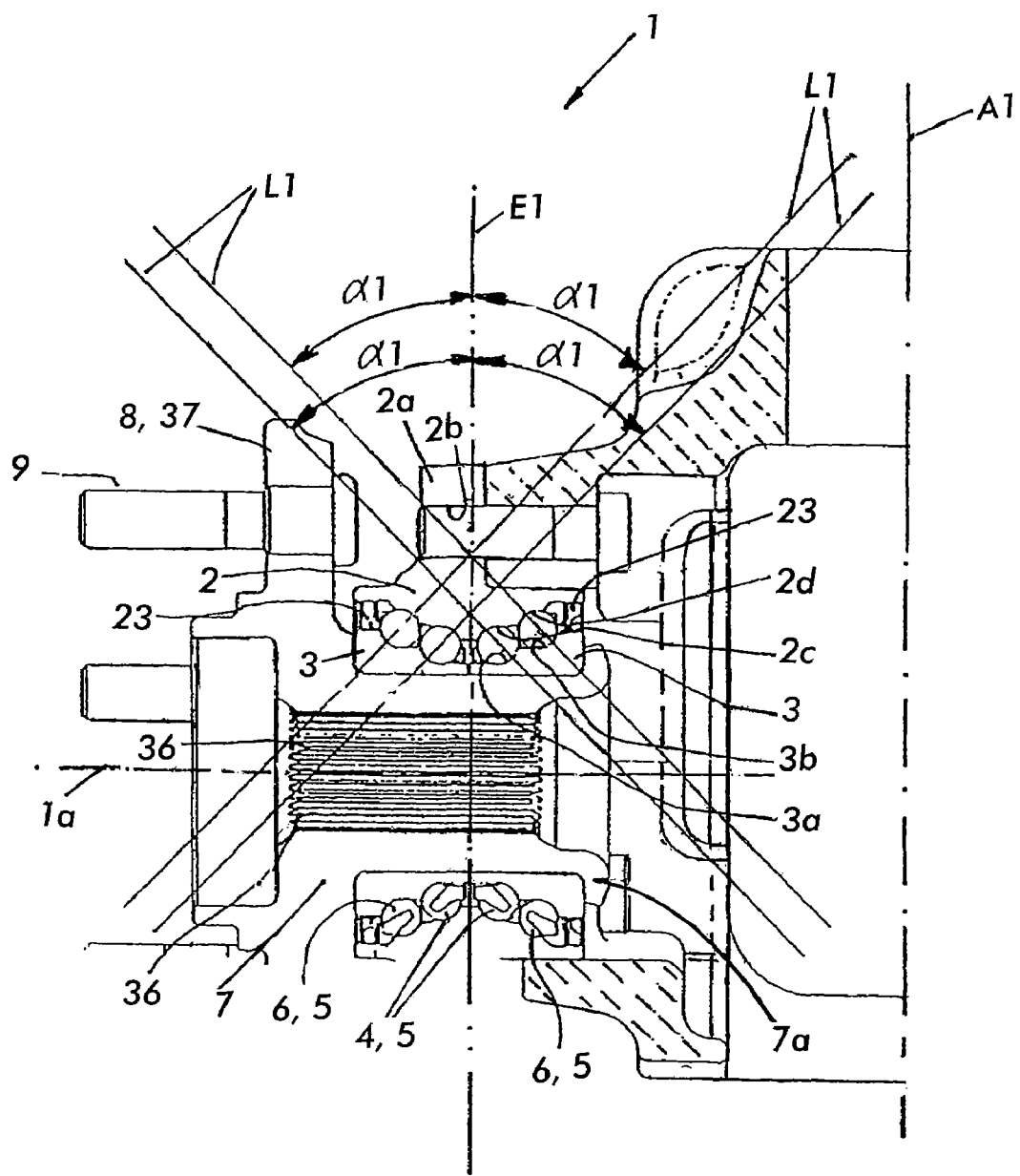
FIG. 2 shows an illustrative embodiment of the invention, in which the one-part outer ring has a flange for fastening to the vehicle and in which generally balls of the same diameter are used in the wheel bearing.

FIG. 1 was explained in greater detail above in the section "Background of the invention". The invention is suitable for wheel bearing arrangements on steered and non-steered vehicle wheels. FIG. 2 shows a wheel bearing unit 1 according to the invention, which is assigned to a wheel bearing construction, which is pivotable about the axis A1, and is driven via a spline 36 or a similar form-fit element. The wheel bearing unit 1 has an outer ring 2, two inner rings 3, two first rows 4 of balls 5 and two second rows 6 of balls 5. A pairing from a first row 4 and from a second row 6 is arranged on each side of the radial plane E1 of the bearing. The wheel bearing unit 1 also has a flange body 7, which is provided with a fastening element 8 in the form of a flange 37. Wheel bolts 9 are located firmly in the flange 37.

The inner rings 3 are located firmly on the flange body 7. A flanged rim 7a formed radially outward from the flange body 7 and pressed against one of the inner rings 3 braces the inner rings 3 against one another and consequently preloads the pairings against one another. In this connection, the balls 5 are supported in the direction of the contact lines $L_1$ on the inner raceways 3a and 3b of the inner ring 3 and the outer raceways 2c and 2d of the outer ring 2.

The one-part outer ring 2 merges with a radial flange 2a with flange holes 2b, with which the wheel bearing unit 1 is fixed in relation to the surrounding environment of the wheel bearing unit, in this case the axle construction. For this purpose, bolts engage in the flange holes 2b.

The balls 5 of the rows 4 and 6 all have the same diameter in relation to one another. The first row 4 and the second row 6 in a pairing are arranged in a tandem arrangement in relation to one another. The pairings are preloaded against one another in what is referred to as an O arrangement. In this connection, the balls 5 are prestressed along the contact lines $L_1$ running at an angle to the central axis 1a. The same pressure angle $\alpha 1$ is formed in each case between the radial plane $E_1$ of the wheel bearing unit 1 and the contact lines $L_1$.

Figure 3:
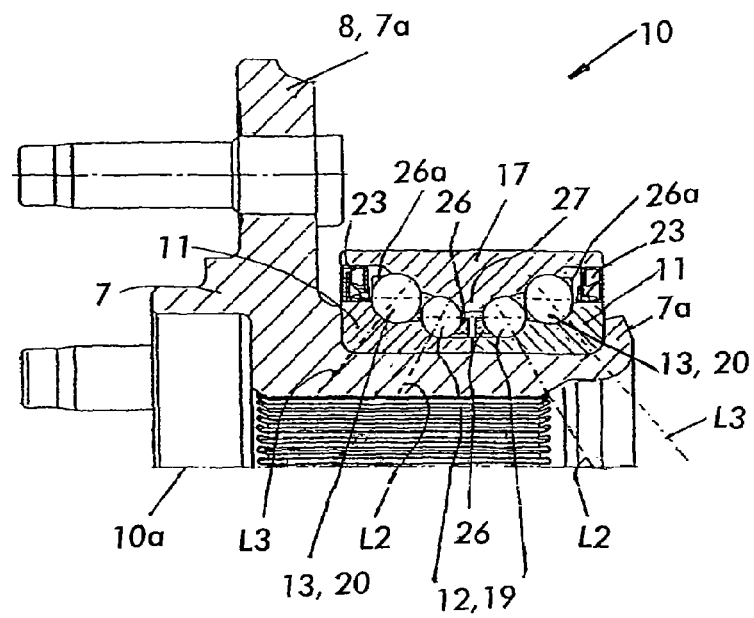
FIG. 3 shows a sectioned part view of a wheel bearing unit according to the invention, which is fastened to the vehicle in a bore via the outer ring.
Figure 4:
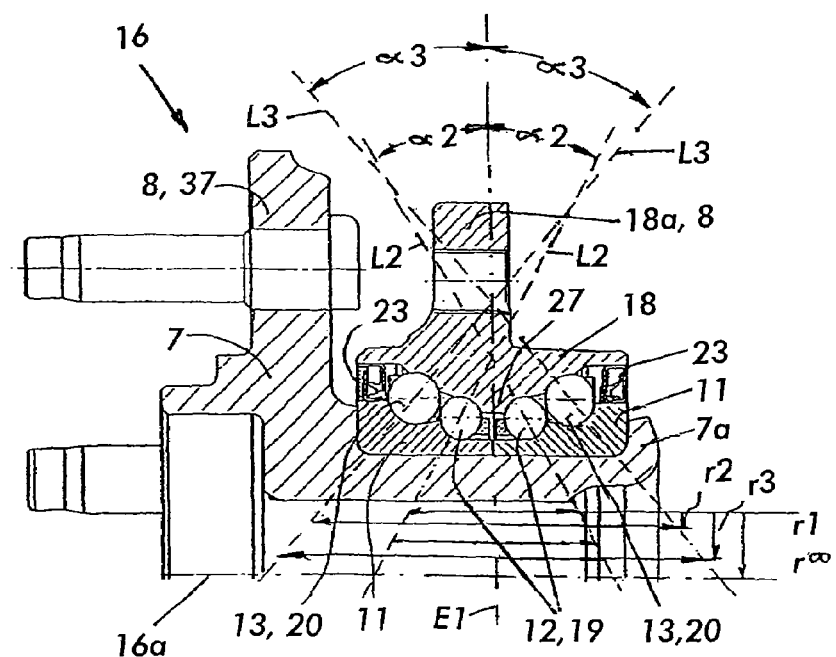
FIG. 4 shows a sectioned part view of a wheel bearing unit according to the invention, in which the rows of balls are preloaded in a TOT arrangement.

FIGS. 3 and 4 show wheel bearing units 10 and 16 which also differ from one another by the embodiment of their outer rings 17 and 18. The outer ring 17 of the wheel bearing unit 10 has a cylindrical lateral surface, with which the wheel bearing unit 10 is firmly fixed on the vehicle in a bore (not illustrated). The outer ring 18 of the wheel bearing unit 16 is provided with a radial flange 18a for fastening to the vehicle. The two wheel bearing units 10, 16 each have two inner rings 11 designed symmetrically in relation to one another, which bear against one another with the rimless side and are prestressed against one another by means of the flanged rim 7a of the flange body 7. A first row 12 of balls 19 is in each case arranged in a tandem arrangement with a second row 13 of balls 20. The balls 19 of the first row 12 have, with the same diameter in relation to one another, a smaller diameter than the balls 20 of the second row 13. The pressure angles $\alpha 2$ and $\alpha 3$ enclosed between the radial plane $E_1$ and the contact lines $L_2$ and $L_3$ respectively differ from row to row, the pairings being preloaded in an O arrangement in relation to one another. The pressure angles $\alpha 3$ are greater than the pressure angles $\alpha 2$. The contact lines $L_2$, $L_3$ of each pairing run at such an angle in the direction of the central axis 10a or 16a that, with decreasing radial spacing $r^2$ to $r^\infty$ from the central axis, the contact lines $L_2$, $L_3$ of the first pairing move away increasingly from the contact lines $L_2$, $L_3$ of the second pairing axially and also move away from one another within a pairing, so that finally the contact lines $L_3$ located axially on the outside intersect the central axis 10a, 16a axially outside the wheel bearing.

Figure 5:
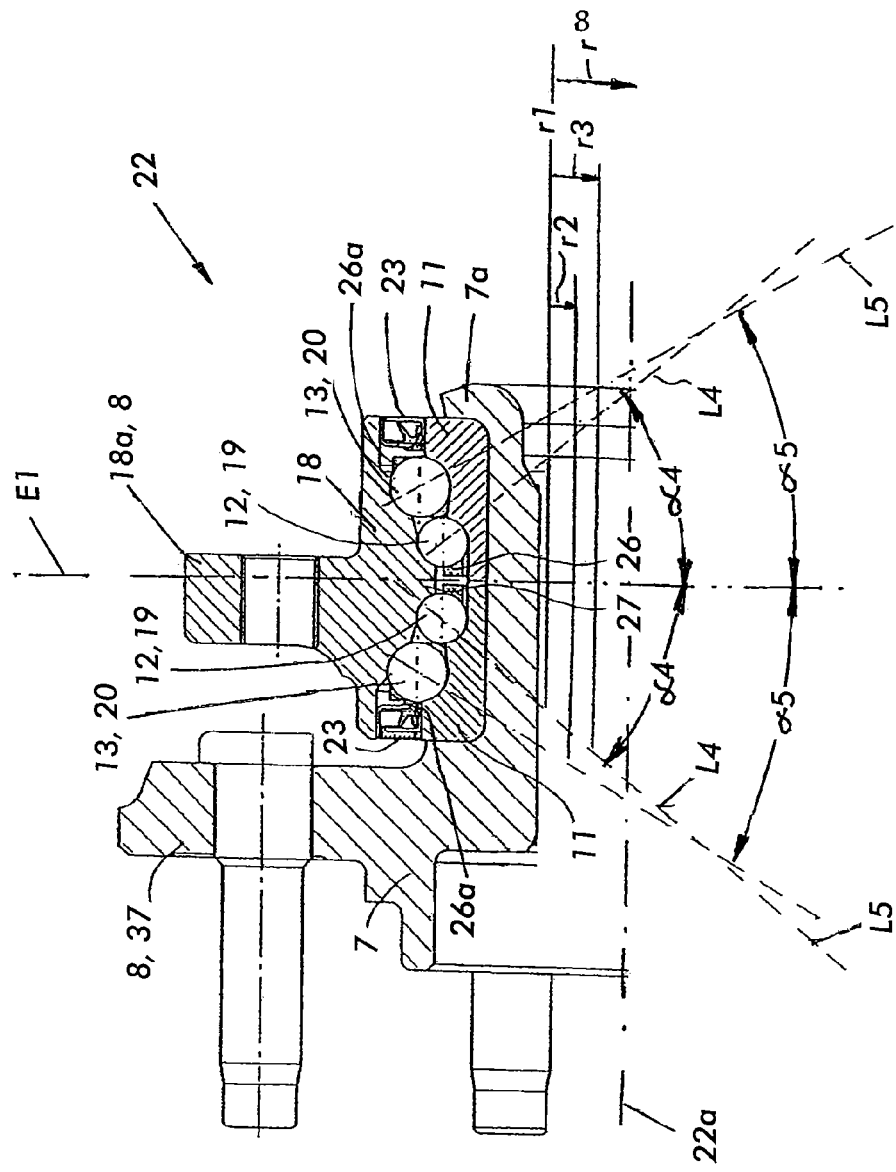
FIG. 5 shows a modification of the wheel bearing unit according to FIG. 4 with differing pressure angles.

FIG. 5 shows a wheel bearing unit 22 with essentially the same construction as the wheel bearing unit 16 according to FIG. 4. However, in the wheel bearing unit 22, a pressure angle $\alpha 4$ between the contact lines $L_4$ of the balls 19 and the radial plane $E_1$ is greater than the pressure angle $\alpha 5$ between the contact lines $L_5$ of the balls 20 in the second rows 13. The contact lines $L_4$, $L_5$ of each pairing run at such an angle in the direction of the central axis 22a that, with decreasing radial spacing $r^1$ to $r^\infty$ from the central axis, the contact lines $L_4$, $L_5$ of the first pairing move away increasingly from the contact lines $L_4$, $L_5$ of the second pairing axially and move closer to one another axially within a pairing, so that finally the contact lines $L_5$ located axially on the outside intersect the central axis 22a axially outside the wheel bearing unit 22 and in each case cross a contact line $L_4$.

Figure 1B:
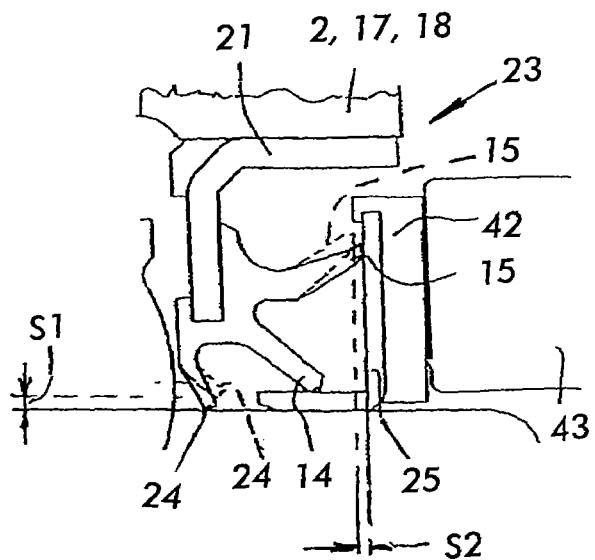

All the wheel bearing units 1, 10, 16 and 22 illustrated in FIGS. 1 to 6 are sealed on both sides on the wheel bearing arrangement by means of the seals 23. The seals 23 are illustrated on enlarged scale in FIG. 1b and are essentially of two-part design. The reinforcement 21 in the form of an angular sheet metal ring is pressed into the inner bore of the outer ring 2, 17, 18 and provided with at least two but preferably three elastic sealing lips 14, 15, 24. Two of the sealing lips 14, 15 bear sealingly against an angled ring 25 of the seal 23 which may also be provided as the slinger plate. The sealing lip 24 bears against the inner ring 3, 11.

Figure 6:
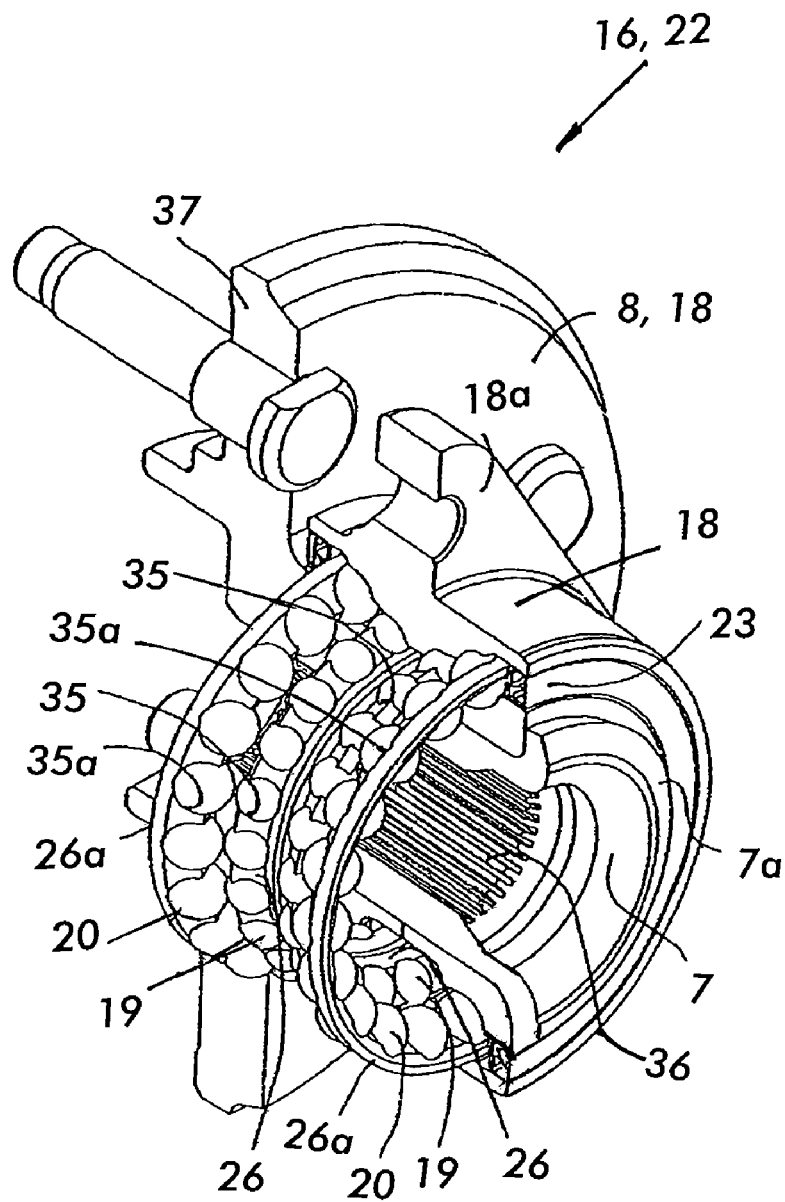
FIG. 6 shows a partly sectioned overall view of a wheel bearing unit according to the invention.

FIG. 6 shows an overall view of the wheel bearing unit 16 or 22, partly in section. The balls 19 and 20 of the first row 12 and second row 13 respectively are in each case held and guided in a ball cage 26, 26a. The balls 19 and 20 are preferably snapped into the pockets 35 and 35a respectively of the ball cage 26, 26a. In this connection, the pockets 35 and 35a are open in one direction axially, the openings of the pockets 35a facing toward one another and the openings of the pockets 35 of the ball cages 26 facing away from one another.

Figure 7:
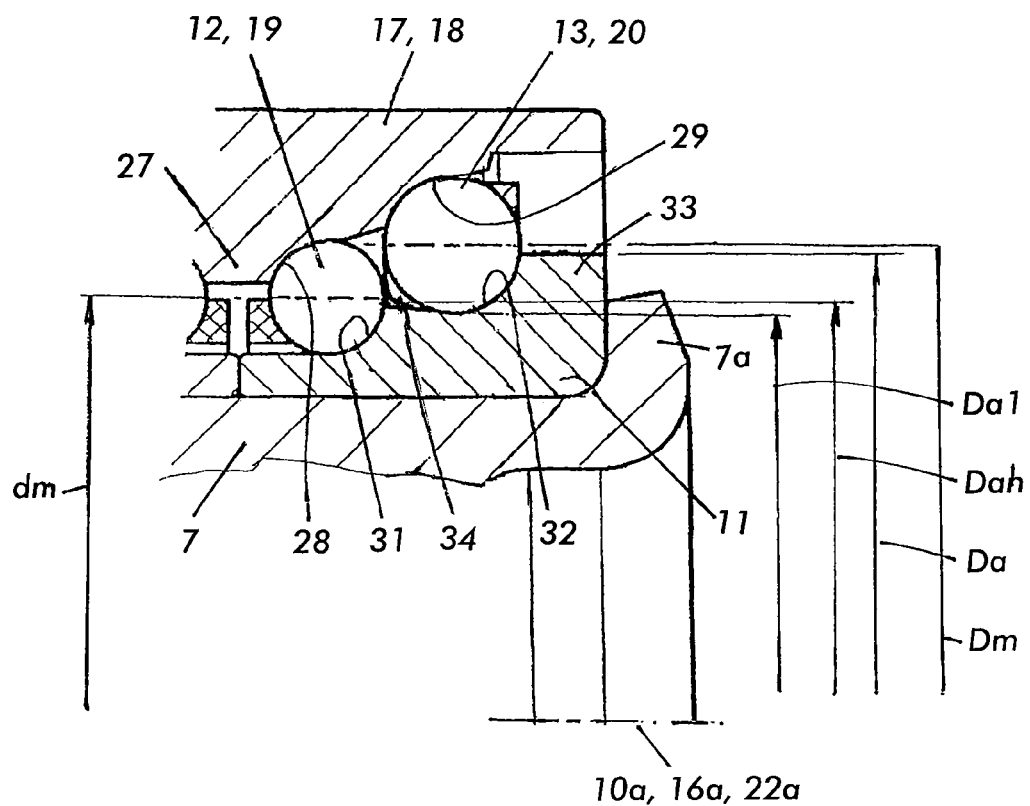
FIG. 7 and FIG. 8 show detailed views of the wheel bearing units described above, in which the geometrical design of the inner rings and of the outer ring are illustrated in greater detail.
Figure 8:
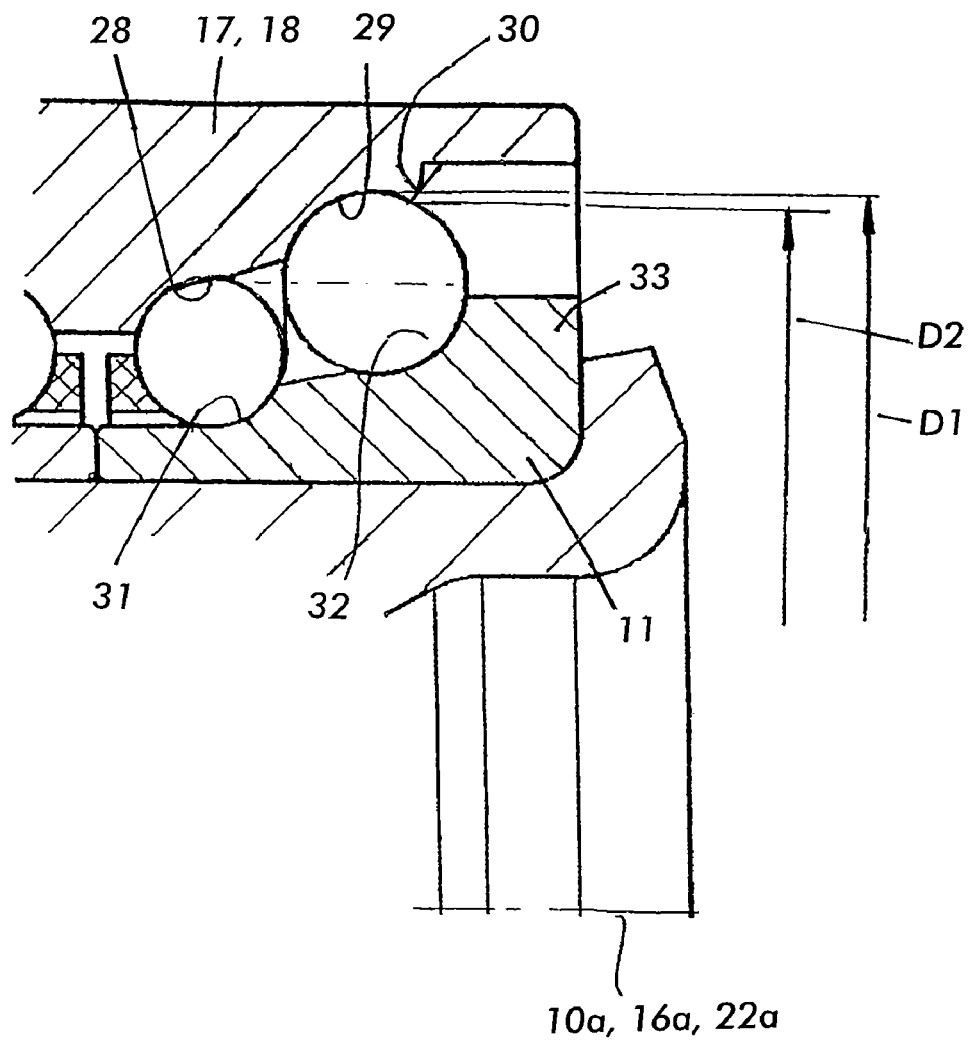

FIGS. 7 and 8 show in enlarged scale the geometrical shape of the rings 11, 17, 18 without illustrating the seal 23, with which the developments described above of the wheel bearing units 10, 16, 22 are optionally designed.

A diameter $d_m$ of the imaginary reference circle passing through the centers of the balls 5, 19 of the first rows 12 and running around the central axis 10a, 16a, 22a is smaller than the diameter $D_m$ of an imaginary reference circle passing through the centers of the balls 20 of the second rows 13 and running around the central axis. The outer ring 17, 18 has a radially inwardly projecting central rim 27. A first inner raceway 28 for one of the first rows 12 and a second inner raceway 29, immediately axially adjacent to the central rim 27, for one of the second rows 13 are designed axially on each side of the central rim 27.

The inner rings 11 each have a first outer raceway 31 for one of the first rows 12. Adjacent thereto are second outer raceways 32 for in each case one of the second rows 13. Each of the inner rings has one of the outer raceways 31 and 32. An outer rim 33 in each case adjoins the first outer raceway 31 axially on the outside of the wheel bearing arrangement. The maximum rim diameter $D_a$ of the outer rim 33 is at least exactly the same as or greater than all other greatest outside diameters at right angles to the central axis 10a, 16a, 22a on the inner ring which are adjacent to the outer rim toward the first outer raceway.

In the development of the inner ring 11 illustrated in FIG. 7, a radial raceway Superelevation 34 is designed axially between the first raceway 31 and second raceway 32. The first outer raceway 31 merges with the raceway superelevation 34 in the direction of the second outer raceway 32. The smallest outside diameter Da1 at right angles to the central axis of the first outer raceway 31 is smaller than the maximum outside diameter of the raceway superelevation $D_{ah}$.

In FIG. 8, the outer ring 17, 18 is slightly modified in comparison with the illustration according to FIG. 7. On a side facing away axially from the first inner raceway 28, the second inner raceway 29 adjoins a diameter constriction 30.

In this connection, the first inner raceway 28 merges with the diameter constriction 30. The greatest inside diameter $D_1$ at right angles to the central axis 16a, 22a of the second inner raceway 29 is greater than the smallest inside diameter $D_2$ at right angles to the central axis 10a, 16a, 22a on the diameter constriction 30. The smallest outside diameter at right angles to the central axis of the second outer raceway 32 is at least the same size as or greater than all other outside diameters of the inner ring 11 which are adjacent to the second outer raceway 32 on a side facing away axially from the outer rim 33.

With such a design of the inner and outer rings, the shoulders and rims which usually hinder the filling of the wheel bearings are dispensed with. It is possible for in each case one of the bearing rings to be equipped with balls of both rows or both races to be equipped with balls of one row each and for the rings then to be slid into one another without hindrance.

The invention claimed is:

1. A wheel bearing unit embodied as an angular contact ball bearing with a central axis, comprising:
   at least two first rows of bearing balls,
   at least two second rows of bearing balls, the second rows being arranged parallel to the first rows,
   an outer ring assembly extending around all the balls together radially on the outside,
   a first pairing formed from a first one of the first rows of balls and from a first one of the second rows of balls, each row of the first pairing being preloaded against a second pairing formed from a second one of the first rows of balls and from a second one of the second rows of balls, each of the pairings having a ball cage to guide the balls of both its rows, the outer ring having located axially on each side of a radially inwardly projecting rim a first inner raceway for one of the first rows of balls at one axial side of the rim and a second inner raceway, adjacent to the first inner raceway, for one of the second rows of balls at the other axial side of the rim.

2. The wheel bearing unit as claimed in claim 1, wherein the rows of balls are so placed that a greatest diameter of an imaginary first reference circle passing through centers of the balls of the first rows and running around the central axis is smaller than a greatest diameter of an imaginary second reference circle passing through the centers of the balls of the second rows and running around the central axis.

3. The wheel bearing unit as claimed in claim 1, wherein the balls of the first row have a smaller ball diameter than the balls of the second row.

4. The wheel bearing unit as claimed in claim 1, wherein the second inner raceway has a side axially facing away from the first inner raceway, a diameter constriction in the second inner raceway adjoining the side of the second inner raceway axially facing away from the first inner raceway, and the second inner raceway merging with the diameter constriction and a greatest free inside diameter of the second inner raceway being greater than a smallest free inside diameter of the diameter constriction.

5. The wheel bearing unit as claimed in claim 1, further comprising at least one inner ring radially inward of the rows of balls, the at least one inner ring having at least one first outer raceway and one second outer raceway for one of the pairings of the rows of balls.

6. The wheel bearing unit as claimed in claim 5, comprising at least two of the inner rings each receiving a respective one of the rows of balls.

7. The wheel bearing unit as claimed in claim 5, further comprising a radially outwardly projecting outer rim on the at least one inner ring, the outer rim adjoining the second outer raceway in the direction away from the first outer raceway and the outer rim having a maximum outer rim diameter which is greater than all other greatest outside diameters of the inner ring which are adjacent to the outer rim toward the first outer raceway.

8. The wheel bearing unit as claimed in claim 7, further comprising a radial, raceway superelevation disposed axially between the first outer raceway and the second outer raceway, the second outer raceway merging with the raceway superelevation in the direction of the first outer raceway, and a smallest outside diameter of the second outer raceway being smaller than a smallest outside diameter of the raceway superelevation.

9. The wheel bearing unit as claimed in claim 7, further comprising at least the balls, the outer ring and the at least one inner ring being combined in a subassembly which holds together;
   a flange body, the at least one inner ring being arranged concentrically on a the flange body, the at least one inner ring bearing axially against the flange body and being held axially and a radially outwardly facing flanged rim pressed axially against an end of the inner ring and holding the inner ring axially.

10. The wheel bearing arrangement as claimed in claim 9, wherein two of the inner rings having ends touching one another, and the two inner rings end are arranged on the flange body, a flange rim prestressing the two inner rings against one another axially, wherein one of the inner rings is pressed axially against the flange body.

11. The wheel bearing unit as claimed in claim 1, wherein pressure angles are enclosed between a contact line of the angular contact ball bearing and an imaginary plane at right angles to the central axis, the pressure angles are the same as one another in their absolute angular degree value from a first row of balls to a second row of balls in a respective one of the pairings.

12. The wheel bearing unit as claimed in claim 1, wherein pressure angles are enclosed between the a contact line of the angular contact ball bearing and an imaginary plane at right angles to the central axis, the pressure angles differing from one another in their absolute angular degree value between the first and second rows of balls in a pairing.

13. The wheel bearing unit as claimed in claim 1, wherein contact lines of the angular contact ball bearing have axial spacing from one of the pairings to another of the pairings and which increases toward the central axis.

14. The wheel bearing unit as claimed in claim 1, further comprising at least one fastening element for a surrounding environment of the wheel bearing unit.

15. The wheel bearing unit as claimed in claim 14, wherein the fastening element comprises a radially extending flange.

16. The wheel bearing arrangement as claimed in claim 14, wherein the fastening element comprises at least one projection which is in one piece with the outer ring, the projection protruding radially outward from the outer ring.

17. The radial bearing unit as claimed in claim 16, wherein the fastening element comprises a flange running around the central axis and the flange having a number of flange holes which are spaced in relation to one another at a periphery of the flange.

* * * * *